United States Patent
Feld

[11] Patent Number: 5,249,773
[45] Date of Patent: Oct. 5, 1993

[54] FLUID FLOW REGULATING VALVE
[75] Inventor: Todd R. Feld, Sheboygan, Wis.
[73] Assignee: Kohler Co., Kohler, Wis.
[21] Appl. No.: 976,135
[22] Filed: Nov. 12, 1992
[51] Int. Cl.⁵ .......................... F16K 1/04; F16K 31/04
[52] U.S. Cl. ................................ 251/129.11; 251/122; 251/227; 251/903; 261/DIG. 38
[58] Field of Search ................. 251/122, 129.11, 227, 251/903; 261/DIG. 38, DIG. 74

[56] References Cited
U.S. PATENT DOCUMENTS

| | | |
|---|---|---|
| 1,392,141 | 9/1921 | Giesler . |
| 2,958,504 | 11/1960 | Lindgren ..................... 251/227 X |
| 3,813,877 | 6/1974 | Hunt . |
| 3,899,552 | 8/1975 | Bauer . |
| 3,981,284 | 9/1976 | Gospodar . |
| 4,075,296 | 2/1978 | Orsini et al. ............ 261/DIG. 38 X |
| 4,167,547 | 9/1979 | Takamuru . |
| 4,229,387 | 10/1980 | Rogerson . |
| 4,407,248 | 10/1983 | Takeuchi . |
| 4,463,724 | 8/1984 | Fukaya . |
| 4,685,434 | 8/1987 | Ando . |
| 4,969,628 | 11/1990 | Reich . |
| 4,976,404 | 12/1990 | Ichikawa . |
| 5,033,433 | 7/1991 | Churchill et al. . |

FOREIGN PATENT DOCUMENTS 59-70863  4/1984  Japan .
60-178943 9/1985  Japan .

Primary Examiner—Gerald A. Michalsky
Attorney, Agent, or Firm—Quarles & Brady

[57] ABSTRACT

The stem of a needle valve for regulating fluid flow is threaded into the valve housing. A reversible electric motor, whose shaft engages the stem coaxially, rotates the stem and causes it to move the plug on the end of the stem into and out of a fluid flow port. A helical spring slidably located in a longitudinal bore in the stem is compressed by the shaft to urge the stem toward the housing in order to maintain a working threadable connection between the stem and the housing even when the stem is almost completely withdrawn.

2 Claims, 1 Drawing Sheet

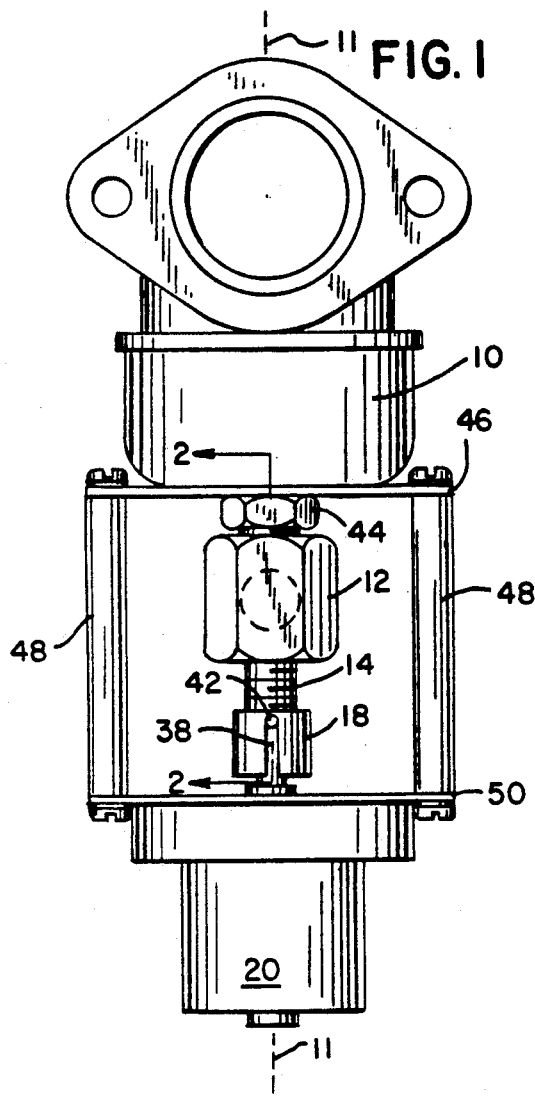
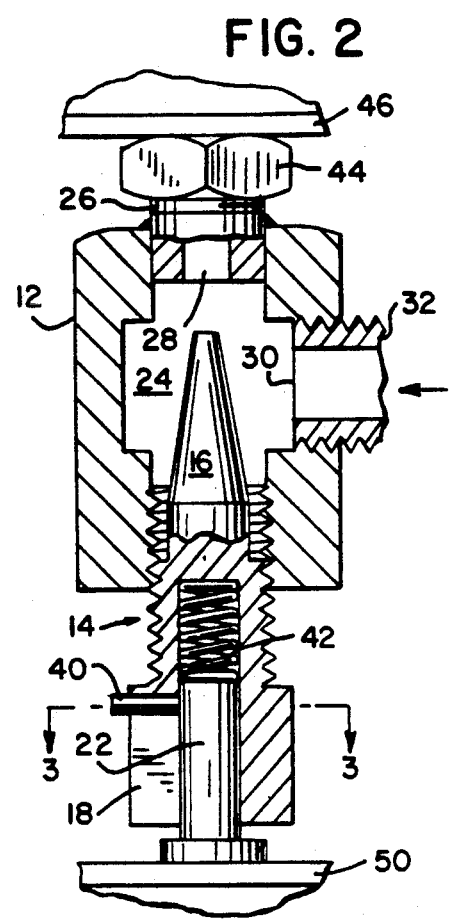
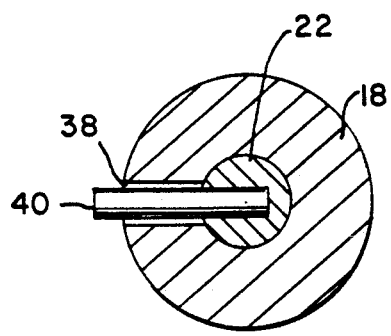
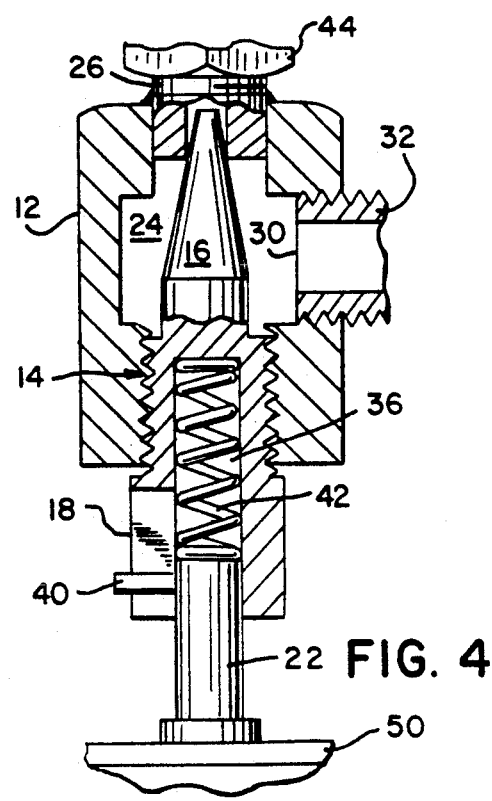

FLUID FLOW REGULATING VALVE

BACKGROUND OF THE INVENTION

Field of the Invention

The invention relates to valves for regulating the flow of a fluid and in particular to motor-driven needle valves which regulate the flow of fuel to the carburetor of an internal combustion engine.

Description of the Art

It is known to regulate fluid flow by using a reversible motor, such as an electric stepper motor, to produce linear movement in the plug of a needle valve. One way to translate the rotational motion of the motor shaft to linear motion of the valve plug is to provide the valve stem with threads which mate with threads in a passageway in the valve housing. When the motor shaft rotates the valve stem, the valve stem moves linearly in the passageway to increase or decrease the opening between the valve plug and the valve seat. To employ such a valve in some applications, such as in a small internal combustion engine, it is desirable to minimize the size of the valve housing. This goal may be frustrated by the need to prevent the valve stem from wobbling and to maintain proper thread alignment, even if the valve is wide open. That need has required a relatively long threaded passageway in the valve housing, thus hampering size and weight reduction.

SUMMARY OF THE INVENTION

The invention permits reduction of the length of the valve housing passageway by employing a spring to prevent wobble and maintain correct thread engagement. A helical spring is compressed in a bore of the valve stem between the end of the bore and a linearly fixed abutment, such as the shaft of an electric motor. The spring urges the valve stem inward with increasing force as the stem is withdrawn, thereby maintaining the alignment of the stem threads with the threads of the housing passageway even if the valve stem has been withdrawn so far that nearly all of the threads have been disengaged.

It is therefore an object of the invention to provide a small and simple motor driven needle valve, which will be especially advantageous in small internal combustion engines but which also may be used in other applications.

Other objects and advantages will be apparent to those skilled in the art from the description of a preferred embodiment of the invention which follows. In the description, references made to the accompanying drawings, which form a part hereof, and which illustrate one embodiment of the invention. That embodiment does not represent the full scope of the invention, but rather the invention may be employed in other embodiments. Reference should therefore be made to the claims herein for interpreting the breadth of the invention. In particular, the drawings and the description are of an embodiment used to regulate the flow of fuel to the carburetor of a small propane internal combustion engine. The invention is, however, not limited to that embodiment or application.

BRIEF DESCRIPTION OF THE DRAWINGS

FIG. 1 is an elevational view of an embodiment of the present invention;

FIG. 2 is an enlarged cross-sectional view of a portion of the valve of FIG. 1, taken along line 2—2 of FIG. 1;

FIG. 3 is a further enlarged cross-sectional view taken along line 3—3 of FIG. 2; and FIG. 4 is a cross-sectional view similar to FIG. 2 except showing the valve in a fully closed position.

DESCRIPTION OF THE PREFERRED EMBODIMENT

The drawings show the invention embodied as a fuel regulator connected to the carburetor 10 of a small propane-powered internal combustion engine (not shown).

Connected to carburetor 10 along a longitudinal axis 11 are a valve housing 12 in fluid flow communication with carburetor 10, valve stem 14 supporting tapered plug 16 at one end and a coupling 18 at the other, and DC stepper motor 20 having a shaft 22 engaged in coupling 18 in a way which will be described below. Through coupling 18, rotation of motor shaft 22 is translated into longitudinal movement of valve plug 16 to regulate the flow of fuel into carburetor 10.

Housing 12 is an elongated metal fitting bored through longitudinally and bored partially from one side. The intersection of these bores defines an intrahousing chamber 24 having a lateral hole and two longitudinal holes, one proximal and one distal relative to carburetor 10. An externally threaded carburetor conduit 26 is fastened into the proximal hole and extends longitudinally outward to be in communication with carburetor 10. The opening of its internal bore into chamber 24 constitutes a fuel outlet port 28 and serves as a seat for plug 16. A fuel inlet port 30 is formed in the lateral hole of housing 12 by threadably fastening into that hole an externally threaded conduit 32 which is in communication with a source of fuel (not shown). The opening of the internal bore of fuel conduit 32 into chamber 24 constitutes fuel inlet port 30. The third or distal hole entering into chamber 24 is threaded to accept externally threaded valve stem 14 which will now be described.

As noted above, valve stem 14 supports on its ends tapered plug 16 and coupling 18. Together they form needle 34. Valve plug 16 is sized and shaped in a tapered form so that it will progressively narrow and then close fuel outlet port 28 as it progressively moves into that port. Coupling 18 an enlarged cylinder bored and slotted in the following way. Needle 34 is longitudinally bored to form internal passageway 36 which extends from the outer end of coupling 18 through a part of valve stem 14. A longitudinal slot 38 in the wall of passageway 36 extends longitudinally from the outer end of coupling 18 to a point just short of the junction between coupling 18 and valve stem 14. In the drawings, slot 38 is shown as extending radially from passageway 36 through the outer surface of coupling 18. However, slot 38 could be made shallower than that so that it would not extend to the surface of coupling 18.

Motor 20 is a reversible DC stepper motor, although other types of motors could be employed. It has a shaft 22 sized to freely move within passageway 36. Mounted orthogonally on motor shaft 22 is crankarm 40. As will be described in greater detail below, when shaft 22 is inserted into passageway 36, crankarm 40 protrudes into slot 38 of coupling 18 to transmit the rotational force of the motor 20 to the coupling 18. Motor 20 is powered and controlled by an electrical source and circuit which are not shown in the drawings.

An important element of the present invention is a conventional helical compression spring 42 which is sized to slidably fit into passageway 36. It is selected to provide sufficient outward force to enable it to serve the anti-wobble and thread alignment functions described below.

In assembling the components described above, a nut 44 is threaded onto carburetor conduit 26, which as noted above is fastened in the proximal opening of stem 14. Conduit 26 is then inserted through a hole in a mounting plate 46 and threaded into carburetor 10. Nut 44 is tightened against mounting plate 46. Longitudinally extending motor mounting posts 48 are fastened to mounting plate 46. Valve stem 14 is threaded into the proximal hole of housing 12 so that plug 16 is in chamber 24. Spring 42 is inserted into passageway 36 and is followed by motor shaft 22 which is positioned so that crankarm 40 engages slot 38. The free ends of mounting posts 48 are fastened to a mounting flange 50 which is part of the shaft-side housing of motor 20.

With the elements so assembled, posts 48 fix the distance between shaft 22 and housing 12, and shaft 22 extends into passageway 36 and abuts spring 42. It will be recognized that shaft 22 is longitudinally stationary relative to housing 12 and therefore serves as a stationary platform for the outer end of spring 42. If a different rotating means were employed, a separate stationary platform would be used in place of motor shaft 22.

In operation, an electrical signal causes motor 20 to rotate shaft 22 and crankarm 40 attached to it. Crankarm 40 rotates stem 14 by means of coupling 18 and thereby screws stem 14 further into or further out of housing 12, depending on the direction of rotation of motor shaft 22. Crankarm 40 remains engaged in slot 38 as coupling 18 moves longitudinally.

FIGS. 2 and 4 illustrate the operation of the regulator by showing the elements when the fuel outlet port is closed (FIG. 4) and when it is fully open (FIG. 2). In FIG. 4, the motor 20 has moved the plug 16 fully into fuel outlet port 28. The threads of stem 14 are fully engaged with the threads of the distal hole of housing 12, spring 40 is relaxed, and crankarm 40 is located near the outer end of coupling 18. Fuel entering chamber 24 via inlet port 30 cannot flow into carburetor 10 because plug 16 blocks outlet port 28. In contrast, in FIG. 2, motor 20 has withdrawn stem 14 so that only one full thread of stem 14 is engaged with one thread of the distal hole of housing 12. Because coupling 18 has moved away from housing 12, crankarm 40 is near stem 14. Because spring 42 has been compressed, it forcibly urges stem 14 toward housing 12 and thereby minimizes wobbling of stem 14 and maintains a firm threaded connection between stem 14 and the distal hole of housing 12. Fuel can flow into carburetor 10 because plug 16 has been withdrawn and outlet port 28 is open. It will be recognized that plug 16 can block outlet port 28 to varying degrees and therefore that motor 20 can variably regulate fuel flow.

The invention claimed is not restricted to the preferred embodiment described above. There may be many modifications and other embodiments which are within the spirit and scope of the invention. Thus, the invention is not to be limited by the specific description above, but should be judged by the claims which follow.

We claim:
1. A fluid flow valve comprising:
   (a) a housing having an inlet and an outlet for flowing fluid and a threaded aperture disposed opposite the outlet along a longitudinal axis;
   (b) an externally threaded stem threadably mounted in the threaded aperture and having an inboard end and a longitudinal bore extending from its outboard end through a portion of its length;
   (c) a tapered plug formed on the inboard end of the stem and pointing toward the outlet such that it opens and closes the outlet as the stem moves along the longitudinal axis;
   (d) a longitudinally oriented compression spring having an inner end slidably within the longitudinal bore of the stem and an outer end;
   (e) a platform having a fixed longitudinal position in respect to the housing and abutting the outer end of the spring;
   (f) reversible means independent of the spring for rotating the stem in relation to the aperture, whereby the plug advances toward or retreats from the outlet.
2. A fluid flow valve comprising:
   (a) a housing having an inlet and an outlet for flowing liquid and a threaded aperture disposed opposite the outlet along a longitudinal axis;
   (b) an externally threaded stem threadably mounted in the threaded aperture and having an inboard end and a longitudinal bore extending from its outboard end through a portion of its length;
   (c) a tapered plug formed on the inboard end of the stem and pointing toward the outlet such that it opens and closes the outlet as the stem moves along the longitudinal axis;
   (d) a longitudinally oriented compression spring having an inner end slidably within the longitudinal bore of the stem and an outer end;
   (e) a platform having a fixed longitudinal position in respect to the housing and abutting the outer end of the spring;
   (f) reversible means for rotating the stem in relation to the aperture, whereby the plug advances toward or retreats from the outlet, the rotating means comprising
      (1) a longitudinally through-bored coupling formed co-axially on the outboard end of the stem and having a longitudinal slot in the wall surrounding the bore and
      (2) a reversible motor having a longitudinally oriented shaft having an end, which constitutes the platform, extending into the bore of the coupling and a transverse crankarm which engages the slot of the coupling.

* * * * *